July 3, 1923.
S. M. HALL
AXLE
Filed May 13, 1922
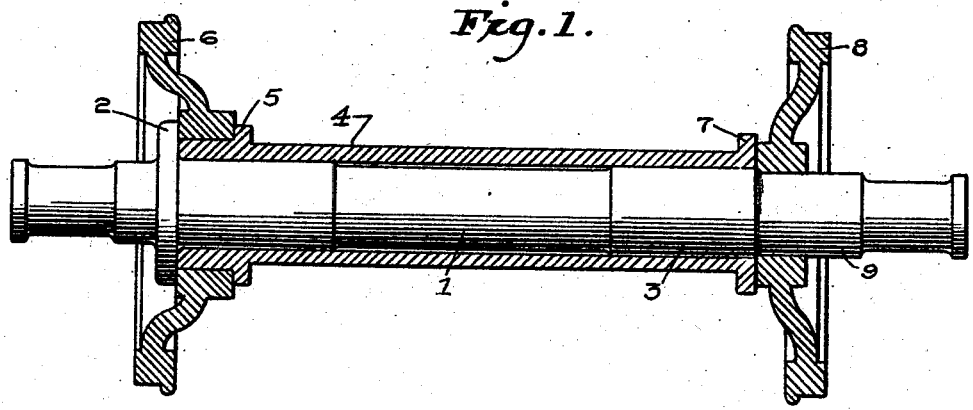
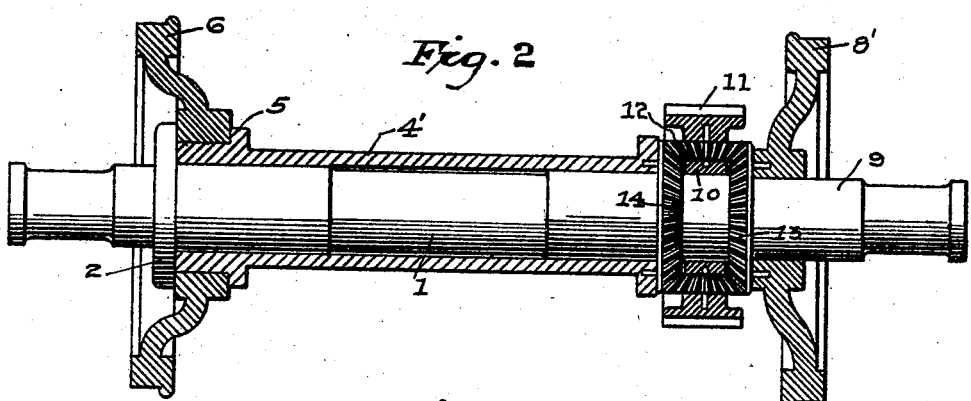
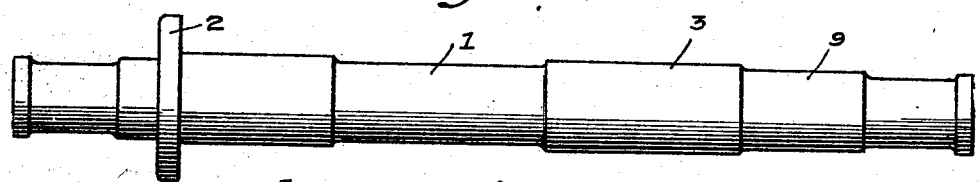
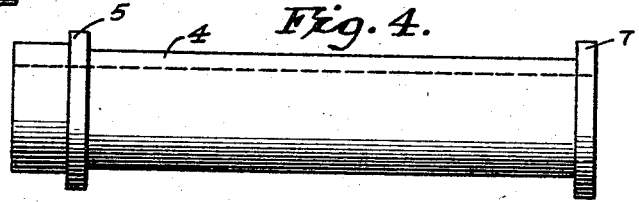

Patented July 3, 1923.

1,460,962

UNITED STATES PATENT OFFICE.

SETH M. HALL, OF PORTLAND, OREGON.

AXLE.

Application filed May 13, 1922. Serial No. 560,754.

*To all whom it may concern:*

Be it known that I, SETH M. HALL, a citizen of the United States, residing at Portland, in the county of Multnomah and State of Oregon, have invented new and useful Improvements in Axles, of which the following is a specification.

This invention relates to improvements in car axles, the general object of the invention being to provide means whereby the wheel at one end of the axle can rotate independently of the wheel at the other end so that the wheels can rotate at different speeds when the car is rounding a curve.

Another object of the invention is to provide differential means for enabling the two wheels to be driven from power means.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view of an axle constructed in accordance with my invention.

Figure 2 is a similar view showing the differential driving means.

Figs. 3 and 4 are detail views.

In these views 1 indicates the axle which is provided with a flange 2 and having the enlargements 3 which form journals for the sleeve 4. This sleeve 4 is slipped over the axle and is rotatably mounted thereon by means of the journals 3. One end of the sleeve abuts the flange 2 and a flange 5 is formed on the sleeve adjacent said abutting end, the two flanges forming a space for receiving the wheel 6. A flange 7 is formed at the other end of the sleeve and the wheel 8 abuts this flange, this wheel being carried by the axle 1. The flange 7 acts as a thrust bearing, the hub of wheel 8 being pressed on to the part 9 of the axle so that the sleeve is held between the flanges 2 and said hub.

It will thus be seen that the wheel 6 will rotate with sleeve 4 upon the axle and wheel 8 will rotate with the axle so that the two wheels have independent movement.

When the wheels are to be driven by power I provide differential means which consists of a hub 10 located between the hub of wheel 8' and the end of sleeve 4' and which forms part of the gear 11. This gear carries the pinions 12 which engage the gear 13 connected with the hub of wheel 8' and the gear 14 which is connected with the sleeve 4'. By this arrangement of parts the two wheels can be driven from the power plant and the wheels will have independent movement and in both forms of the invention the axle is of solid construction and is not divided as in an ordinary differential construction.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a vehicle, an axle therefor, a flange formed integral with the axle adjacent one end, a spaced enlargement formed on the axle adjacent each end on one side of the flange, a sleeve rotatably mounted on the enlargements and abutting the flange, a flange formed on the sleeve adjacent its abutting end, a wheel carried by the sleeve between said flanges and adapted to rotate with the sleeve, a flange formed on the extreme opposite end of the sleeve which terminates on the adjacent enlargement, a wheel placed on the axle abutting the last mentioned enlargement and spaced from the end of the sleeve, a hub surrounding the enlargement and being arranged in the space between the wheel and the end of the sleeve for taking up the thrust therebetween, a gear carried by the last mentioned flange, a gear carried by the last mentioned wheel, and pinions meshing with the gears and fixed to the hub as and for the purpose specified.

In testimony whereof I affix my signature.

SETH M. HALL.